May 23, 1933.  C. SPAETH  1,910,070
HOSE NOZZLE
Filed Dec. 16, 1929
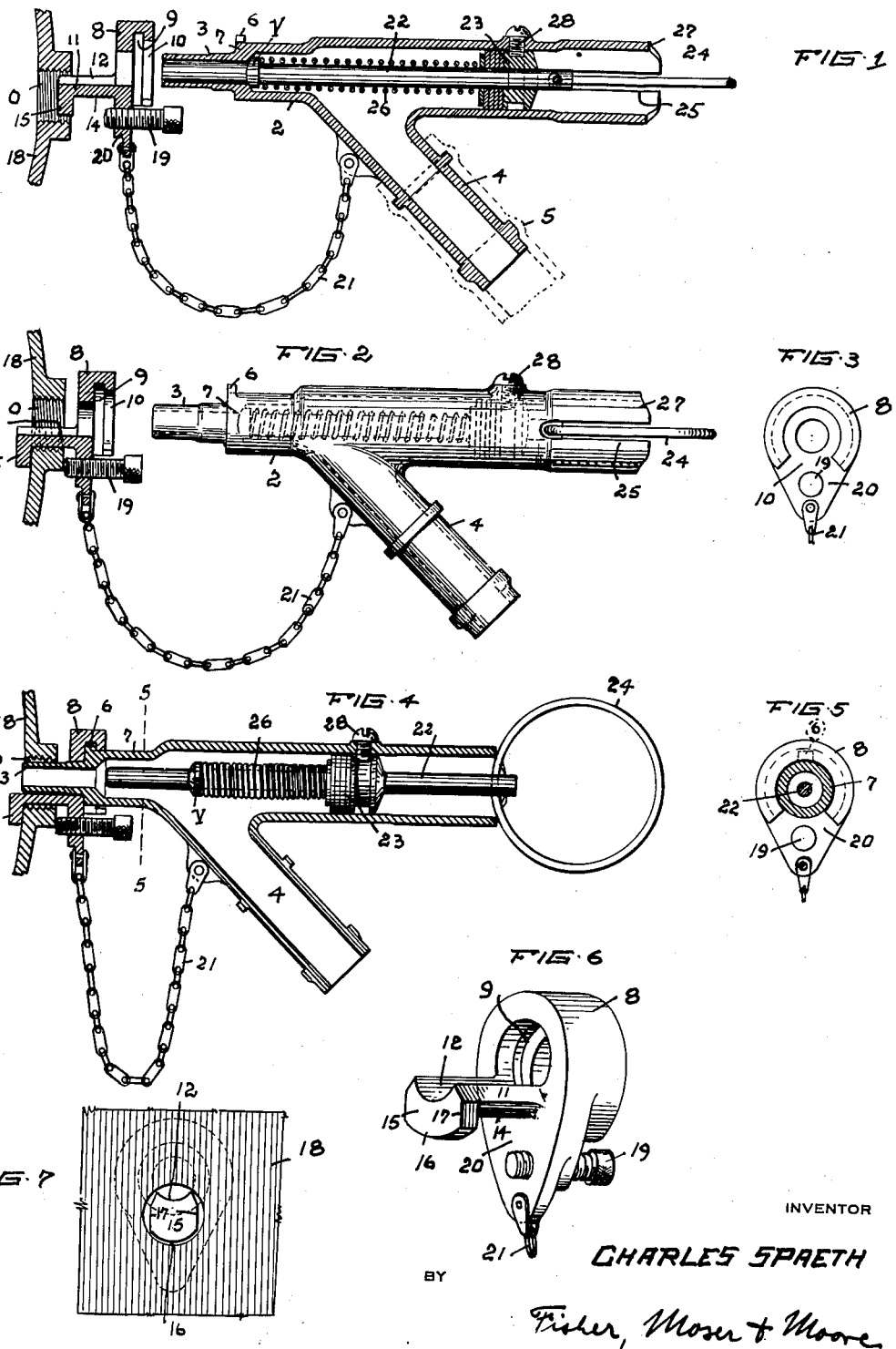
INVENTOR
CHARLES SPAETH
BY Fisher, Moser & Moore
ATTORNEY Patented May 23, 1933

1,910,070

UNITED STATES PATENT OFFICE

CHARLES SPAETH, OF CLEVELAND, OHIO

HOSE NOZZLE

Application filed December 16, 1929. Serial No. 414,399.

This invention pertains to hose nozzles, and particularly nozzles designed and constructed to deliver or discharge a lubricant, such as grease or a heavy lubricating oil, into a casing or container, for example, an axle or gear housing in a motor driven vehicle. In general the object of the invention is to provide a nozzle having an attachment device adapted to permit the nozzle to be projected through filling openings of different sizes and to be quickly and readily attached to the casing or housing to support the hose during filling operations. The present nozzle also includes means for sealing and closing the outlet end or mouth thereof when the nozzle is not in use, and the nozzle and its attachment member are also particularly constructed to simplify and promote the handling and attachment of the hose and nozzle by a single attendant at a filling station. In brief the invention permits a nozzle to be readily attached to a casing or housing to pump grease thereinto without waste or leakage and without requiring an extra attendant to hold the nozzle in place or constantly attend the nozzle itself during delivery operations.

In the accompanying drawing, Fig. 1 is a sectional view of the present nozzle, and attachment member, separated and in position to be inserted within a filling opening. Fig. 2 is a side elevation of the nozzle separated from the attachment member, and a sectional view of the attachment member secured within a filling opening. Fig. 3 is an end view of the attachment member. Fig. 4 is a sectional view of the nozzle and its attachment secured together within the filling opening. Fig. 5 is a cross section of the nozzle on line 5—5 of Fig. 4. Fig. 6 is a perspective view of the attachment member. Fig. 7 is an end view of the attachment member placed within a relatively small opening in a housing, showing that it conforms closely in part to such an opening.

The nozzle comprises a tubular member or main body 2 having a reduced cylindrical extension or spout 3 at one end an angularly-related handle or hose coupling branch 4 depending therefrom. A flexible hose 5 is secured to branch 4, which hose is usually connected with or forms a part of a grease pump or other source of supply under pressure. Body 2 is provided with a radial lug 6 at its front end 7 where shouldered and abruptly reduced, and this lug serves as a locking element for a channeled attachment member 8 which is adapted to receive spout 3 or to be sleeved thereon. Member 8 is also adapted to be rotatably connected to body 2 the lug 6 being free to travel in an annular channel 9 within member 8 when the parts are assembled or sleeved together. A flaring entrance 10 at the bottom of the internal channel 9 permits lugs 6 to enter channel 8 when member 8 is sleeved on the spout or extension 3, and when either member 8 of body 2 is rotated relatively to the other, say one-half a turn, the parts are locked together. When so related member 8 will support spout 3 within a filling opening O of either small or large diameter, and in practice several different sizes of filling openings must be accommodated. The spout 3 itself is designed to fit snugly within the smallest opening used in axle or gear housing without attachment member 8, the mere weight of the nozzle and hose serving to lock the nozzle in place when the spout is projected into such an opening. In encountering larger filling openings the member 8 is first attached to and secured within the opening, said member being provided with a hook-shaped finger 11 projected forwardly from the front end of member 8, see Figs. 2 and 6. Finger 11 has a concaved upper face 12 adapted to seat the round spout 3, and the lower surface 14 of finger 11 is convexly rounded so that it may fit and rest within a circular filling opening of slightly larger diameter than spout 3. To permit the introduction of finger 11 into an opening of approximately the same diameter as the convexly curved part 14 of finger 11, the lip or hook 15 on the finger is also curved or rounded at its lower edge 16, and the straight side edges 17 of the finger beveled on converging lines, see Fig. 7. A relatively long lip or hook end may thus be used on the finger to connect and support the nozzle effectually on the casing or housing 18. A more rigid and fixed connection can be made by using a set screw 19 or equivalent locking device on member 8 opposite the hooked end of the finger, and in the present instance the set screw is mounted on an integral arm 20 depending from the main body of member 8. A chain or other flexible element 21 is employed to connect member 8 with nozzle branch 4, thereby preventing member 8 from becoming completely detached from the nozzle, and permitting the nozzle to be used without member 8 when the need arises.

Preferably, the mouth of the nozzle itself should be closed and sealed at all times, except when delivering a lubricant, and in the present devices this means the discharge mouth or spout 3. Accordingly, a plunger valve V is provided within tubular body 2, which valve includes a relatively long stem 22 extending through a packing member 23 and having an operating ring or handle 24 at its outer end. Ring 24 extends through side slots 25 in tubular body 2 and also through the open end of the body so that the ring may be grasped by hand and withdrawn against the tension of a compression spring 26 sleeved upon stem 22. By giving the ring and valve a quarter turn the ring may be caused to seat itself on the end edge 27 of body 2, thereby holding the valve open as delineated in Fig. 4. Packing member 23 is secured fixedly within body 2 by a screw 28, or any other suitable means.

What I claim is:

1. A hose nozzle having a spout, a supporting member for said nozzle having an opening for receiving and seating the spout of said nozzle, a hook shaped finger portion forwardly of said supporting member, means on said supporting member cooperating with the hooked end of said finger portion for independently securing said supporting member in front of a filling opening and means on said spout and said supporting member for axially and rotatably securing said parts together.

2. A hose nozzle, a perforated coupling member sleeved upon and detachably connected with the delivery end of said nozzle, an integral hook shaped finger portion forwardly of said coupling member and screw means in said coupling member cooperating with the hook of said finger portion in attaching said member to a container in front of the filling opening thereof.

3. A hose nozzle having a discharge spout, a supporting member for said nozzle releasably and freely rotatably sleeved upon and interlocked with said spout and a hook shaped finger projected forwardly from the spout end of said member having a seating face convexly rounded to permit resting of said finger upon the edge of a filling opening into which said finger has been inserted.

4. A hose nozzle having a reduced discharge spout and a lateral projection, a perforated supporting member having a hook-shaped extension and co-operating screw means opposite the hook portion of said extension for securing said members rigidly in front of a filling opening, said member also having an opening for said discharge spout formed with a locking channel to receive the lateral projection of said nozzle when the latter is extended through said opening and supported in said member.

In testimony whereof I affix my signature.

CHARLES SPAETH.